United States Patent [19]

Rew et al.

[11] Patent Number: 5,231,857
[45] Date of Patent: Aug. 3, 1993

[54] WASHING MACHINE WITH ROLLER TYPE AGITATOR

[75] Inventors: Jae C. Rew, Seoul; Kwan R. Park, Busan; In C. Jung, Seoul, all of Rep. of Korea

[73] Assignee: Goldstar Co., Ltd., Rep. of Korea

[21] Appl. No.: 728,156

[22] Filed: Jul. 10, 1991

[30] Foreign Application Priority Data

Dec. 4, 1990 [KR] Rep. of Korea ............... 19864/1900
Dec. 7, 1990 [KR] Rep. of Korea ............... 20136/1990
Dec. 26, 1990 [KR] Rep. of Korea ............... 21792/1990

[51] Int. Cl.⁵ .................................... D06F 37/00
[52] U.S. Cl. .................................... 68/134; 68/54; 68/106
[58] Field of Search ............... 68/34, 54, 30, 48, 42, 68/46, 49, 52, 68, 71, 79, 89, 106, 90, 97, 63, 31, 134

[56] References Cited

U.S. PATENT DOCUMENTS

| | | | |
|---|---|---|---|
| 38,307 | 4/1863 | Haldeman | 68/106 |
| 154,841 | 9/1874 | Cochran | 68/86 |
| 1,745,177 | 1/1930 | Markley | 68/63 X |
| 2,630,695 | 3/1953 | Altorfer | 68/34 X |
| 3,922,890 | 12/1975 | Shibata | 68/89 X |
| 4,102,156 | 7/1978 | James | 68/134 X |
| 4,691,538 | 9/1987 | Shikamori et al. | |

FOREIGN PATENT DOCUMENTS

| | | |
|---|---|---|
| 534284 | 1/1955 | Belgium . |
| 557091 | 5/1957 | Belgium . |
| 1119476 | 6/1956 | France . |
| 193641 | 5/1965 | Sweden ............... 68/134 |
| 2145435 | 3/1985 | United Kingdom . |

Primary Examiner—Frankie L. Stinson
Attorney, Agent, or Firm—Ostrolenk, Faber, Gerb & Soffen

[57] ABSTRACT

A washing machine comprising a roller type agitator and an auto-balancer. The roller type agitator is provided at the lower portion inside the washing tub 3 and includes at least one roller rotatably mounted thereto in order to generate water flow and provide a bending and stretching action and a squeezing action for said laundry articles and a smooth circulation of washing water. The auto-balancer is provided at the upper portion inside the washing tub and includes a plurality of washing protrusions. The roller includes a plurality of washing water ports at the circumferential outer surface and both side surface thereof, respectively. The present invention can provide a washing machine which can provide a good washing effect and an excellent washability irrespective of the quantity of the laundry articles and the volume of the laundry article.

13 Claims, 11 Drawing Sheets

WASHING MACHINE WITH ROLLER TYPE AGITATOR

BACKGROUND OF THE INVENTION

The present invention relates to a washing machine with a roller type agitator, and more particularly to a washing machine with a roller type agitator including rollers for providing a water flow and a rolling action for the laundry articles, thereby improving the washability of laundry articles.

Figure 1:
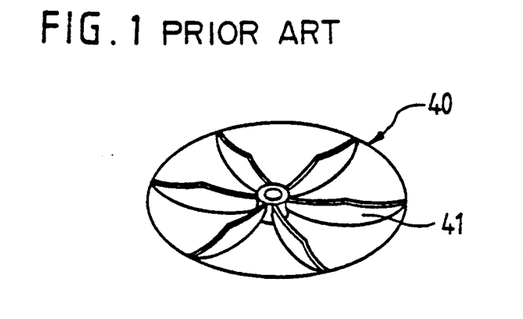
FIG. 1 is a schematic perspective view showing a rotary vane wheel type agitator.
Figure 2:
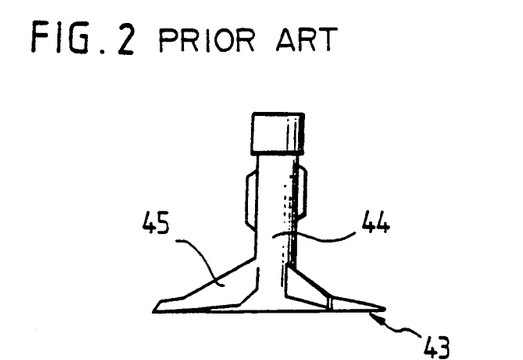
FIG. 2 is a front view showing a pulsator (agitator vane wheel) type agitator.
Figure 3:
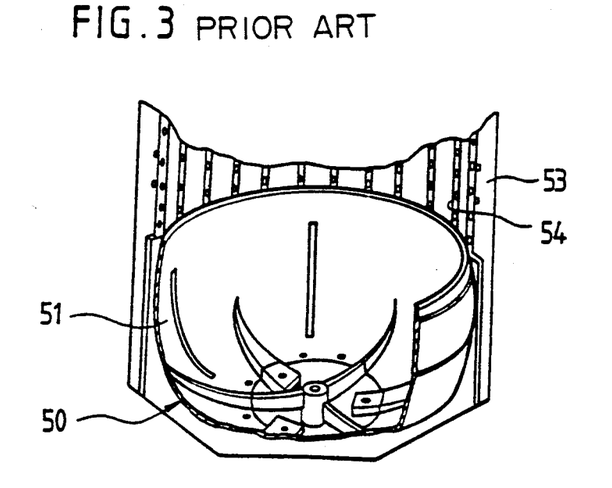
FIG. 3 is a partially broken inner perspective view showing a rotary tub vane wheel type agitator.

Generally, known washing machines are classified according to the type of agitator into three types: the rotary vane wheel type as shown in FIG. 1, the pulsator (agitator vane wheel) type as shown in FIG. 2 and the rotary tub vane wheel type as shown in FIG. 3.

As shown in FIG. 1, the washing machine of the rotary vane wheel type, in which the laundry articles, particularly clothes, are washed by a frictional effect generated from contacting with vanes 41 of the vane wheel 40, a bending and stretching effect provided by the water flow, can efficiently wash the small quantity of laundry articles as a result of an active water flow. However, while it can not efficiently wash large quantity of laundry articles, as the generation of the water flow is deficient and the laundry articles may not be sufficiently circulated. Therefore, this type of washing machine has a disadvantage that it can efficiently wash a part of the laundry articles within the range of contact with the vanes 41, but can not efficiently wash the other part of the laundry articles beyond the range of contact.

As shown in FIG. 2, the washing machine of the pulsator type includes a washing rod 44, which washing rod 44 provided at the center of the pulsator 43 and adapted to generate a rotating water flow and an upward and downward circulating water flow in cooperation with the agitating vanes 45 in order to activate the circulation of the laundry articles and improve the washability by providing a mechanical action generated among the agitating vanes 45, the washing rod 44 and the laundry articles. However, it has been known that this type of washing machine has disadvantages in that the washability thereof is relatively lower than that of the above-mentioned washing machine of the rotary vane wheel type. Inconvenience in putting in and taking out the laundry articles and also in the case of washing the large quantity of laundry articles arises or a large volume laundry article because of the disturbance by of the washing rod 44 provided at the center of the pulsator 43.

As shown in FIG. 3, the washing machine of the rotary tub vane wheel type, in which the laundry articles are circulated accompanying the washing water in circulation by the viscous friction generated from the contact with the side wall 51 of the rotary tub vane wheel 50, washes the laundry articles by using the frictional contact with the side wall 54, the difference in the respective speeds of the washing water and the laundry articles during the reversed rotation. However, in the case of reversed rotation, there is only an intermittent circulation of the laundry articles with a small difference in the relative speed between the washing water and the laundry articles for a little time until reaching the normal speed in the reversed rotation. Thus, there are disadvantages that the washing effect is not good, furthermore, the circulation of the laundry articles is more deficient in the case of the large quantity washing so that the washing effect is deteriorated.

As described above, the known washing machines have several drawbacks, such as relatively low washing effect, an unequal washing, a bad washing in case of the large quantity washing and a large volume laundry articles (a blanket, bed clothes and the like) and the fabric damage in case of small quantity washing.

In effort to solve the above-mentioned drawbacks, the inventors of the present application have proposed several types of washing machines which could considerably improve the washing effect in comparison with the above-mentioned washing machines.

Generally, the washing machine comprises a washing section wherein the laundry articles are directly subject to the washing operation in the washing water, a driving section for driving the washing section and a supporting section for supporting the washing and driving sections. In addition, the washing section, comprising several washing elements, is the most important part because it influences the washing effect much more than any other sections. In accordance, the washing effect will be considerably ameliorated by providing the newly proposed washing elements, such as the washing tub and agitating member and the like, having improved structures, respectively. As a result, the inventors have proposed several washing machines having agitating members provided with rollers, respectively, thereby making it possible to improve the washing effect.

Korean Utility Model Application No. 89-16983 discloses a representative example of the washing machines proposed by the inventors. This type of washing machine includes an auxiliary agitator provided at the lower part inside the washing and dehydrating tub (hereinafter, referred to simply as the washing tub), the agitator equipped with rollers at a side wall thereof.

Figure 4:
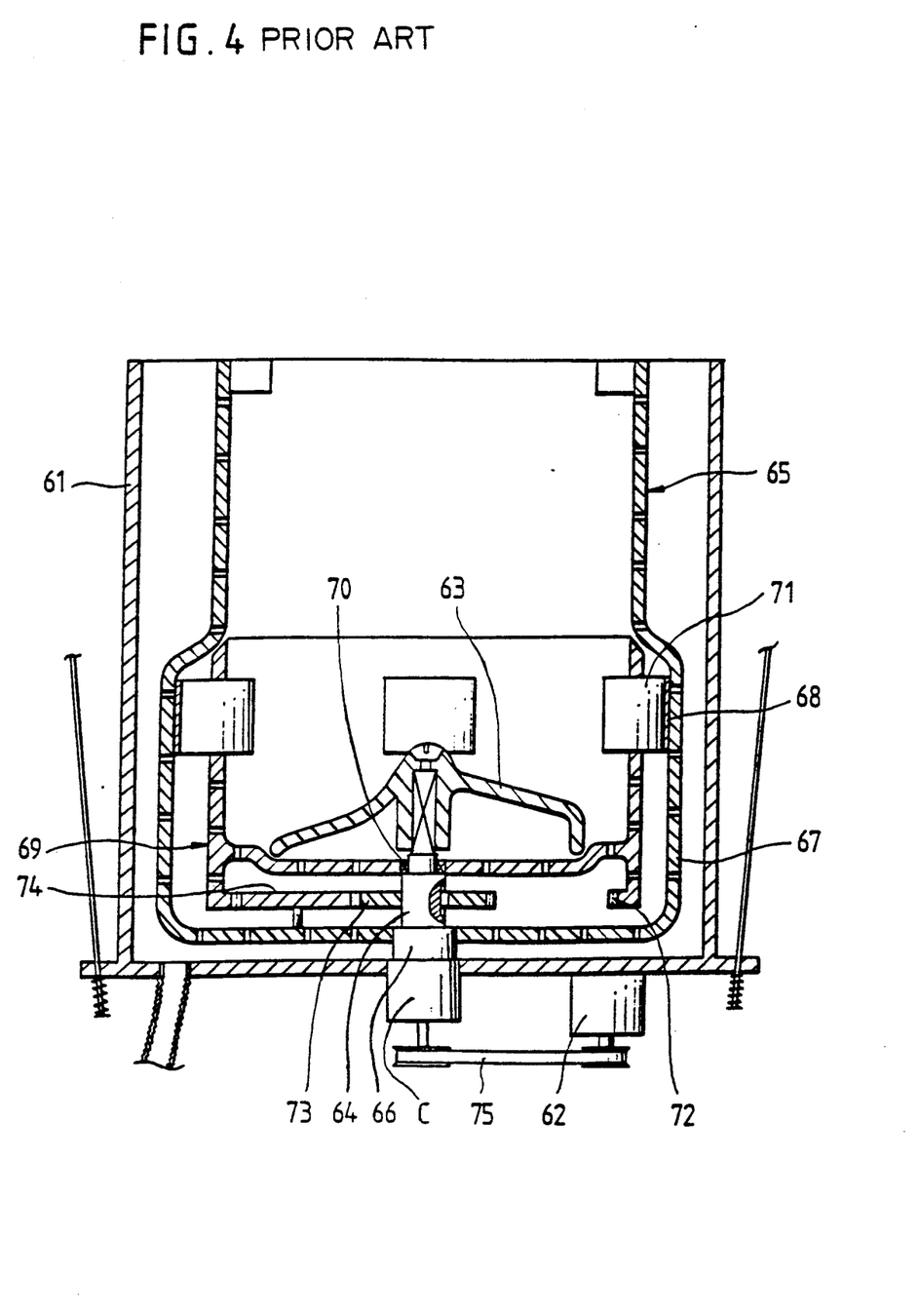
FIG. 4 is an elevational sectional view showing another embodiment of a known washing machine previously proposed by the inventors of this invention.

As shown in FIG. 4 which is an elevational sectional view of this washing machine, the washing machine comprises a driving motor 62 installed at a side below the bottom of the outer tub 61, a conventional clutch C provided at the center of the outer tub 61 and having a washing shaft 64, including at an upper portion an agitator vane wheel 63, and a dehydrating shaft 66 adapted for driving the washing tub 65 to rotate, said driving motor 62 driving the clutch C to carry out the washing and dehydrating operations. There is provided at the lower portion of the washing tub 65 a diametrically enlarged section 67, which section 67 has a larger inner diameter than that of the upper portion of the washing tub 65 and is provided with a rubber ring 68 mounted to the inner surface thereof. The washing shaft 64 of the clutch C is provided with an agitating tub 69 supported by a bearing 70 at an upper portion thereof, agitating tub 69 having a plurality of rollers 71 rotatably mounted at the side wall thereof rotating according to the frictional power provided by the contact with the rubber ring 68. The agitating tub 69 has a sun gear 72 formed at the lowermost portion thereof and engaging with a connecting planet gear 74, which planet gear 74 in turn engages with a driving sun gear 73 fixedly mounted under the bearing 70 to a lower portion of the washing shaft 64 of the clutch C.

In operation of the washing machine with the above-mentioned structure, the driving power from the driving motor 62 is transmitted to the clutch C by way of a belt 75 in order to drive only the washing shaft 64 by means of the clutching action of the clutch C, thereby causing the agitator vane wheel 63 to rotate. At the same time, the driving sun gear 73 fixed to the washing shaft 64 rotates so as to transmit the rotational power to the sun gear 72 by way of the connecting planet gear 74, thereby making it possible to drive the agitating tub 69 to rotate in the opposite direction to the rotating direction of the agitator vane wheel 63.

At this time, the heart water flow generated by the rotation of the agitator vane wheel 63 will be more active by being subject to the centrifugal force provided by the rotation of the agitating tub 69. Also, counter flow occurs inside the lower portion of the agitating tub 69 as a result of the opposite directional rotations of the agitating vane wheel 63 and the agitating tub 69, so that there may be an intense water flow capable of providing a scrubbing effect for the laundry articles.

Additionally, simultaneously with the contact of the rubber ring 68 attached to the inner surface of the diametrically enlarged section 67 of the washing tub 65 the plurality of rollers, rotatably mounted to the upper side wall of the agitating tub 69, rotate at a high speed. The rotation of the rollers 71 provides the intensive scrubbing action against the laundry articles being forced out of the center of the washing tub 65 by means of the centrifugal force generated by the rotations of the agitating tub 69, thereby improving the washing effect.

On the other hand, the clutch C acts in dehydrating procedure to drive the agitator vane wheel 63, the agitating tub 69 and the washing tub 65 to rotate at the same time in order to carry out the dehydrating operation.

As described above, the washing machine proposed by the inventors provides an intensive heart water flow generated by the rotation of the agitator vane wheel 63 and an intensive counter flow caused by the opposite directional rotations of the agitating vane wheel 63 and the agitating tub 69 so that the laundry articles can be subject to the scrubbing action, and the washing effect may be improved. Furthermore, the washing machine can provide considerably improved washing effect by the rolling action of the rollers acting on the laundry articles being forced out of the center of the agitating tub as a result of the centrifugal force, thereby making it possible to wash the large quantity of laundry articles and also considerably reduce the quantity used of washing water because of the intensive water flow.

However, this type of washing machine must have the diametrically enlarged section at the lower portion of the washing tub, for equipping with the agitating tub, and be provided with the driving mechanism, having a relatively complex structure, so that it may have little compatibility with the conventional washing machine. Furthermore, the agitating tub of this washing machine is provided with the rollers at the upper side wall thereof so that the agitating force may be weaker than those of another embodiments each having an agitator provided with rollers directly mounted thereto.

SUMMARY OF THE INVENTION

It is, therefore, an object of the present invention to provide a washing machine with a roller type agitator which can equally wash the laundry articles and provide an improved washability, without any fabric damage and irrespective of the fabric quantity.

It is another object of the present invention to provide a washing machine with a roller type agitator which can provide a good washing effect in the case of washing a large volume laundry article, such as a blanket and bed clothes.

It is still another object of the present invention to provide a washing machine with a roller type agitator which can accomplish a compactness of the washing tub in comparison with the washing capacity.

In accordance with the present invention, the above-mentioned objects can be accomplished by providing in a washing machine a housing, a washing tub, a driving mechanism for providing a driving power for a washing part, an agitator provided inside the washing tub and adapted for agitating laundry articles, the agitator comprising a roller type agitator provided with a least one roller rotatably mounted thereto, the roller type agitator providing a bending and stretching action and a squeezing action for laundry articles and a smooth circulation of washing water.

BRIEF DESCRIPTION OF THE DRAWINGS

The above and other objects, features and other advantages of the present invention will be more clearly understood from the following detailed description taken in conjunction with the accompanying drawings, in which:

FIGS. 1 to 3 are views showing embodiments of an agitator equipped to a known washing machine, in which:

FIGS. 5 to 7 are views each showing an embodiment of a washing machine with a roller type agitator in accordance with the present invention, in which:

FIGS. 8 to 10 are views showing embodiments of an agitator in accordance with the present invention, respectively, in which:

DETAILED DESCRIPTION OF THE PREFERRED EMBODIMENTS

Figure 5:
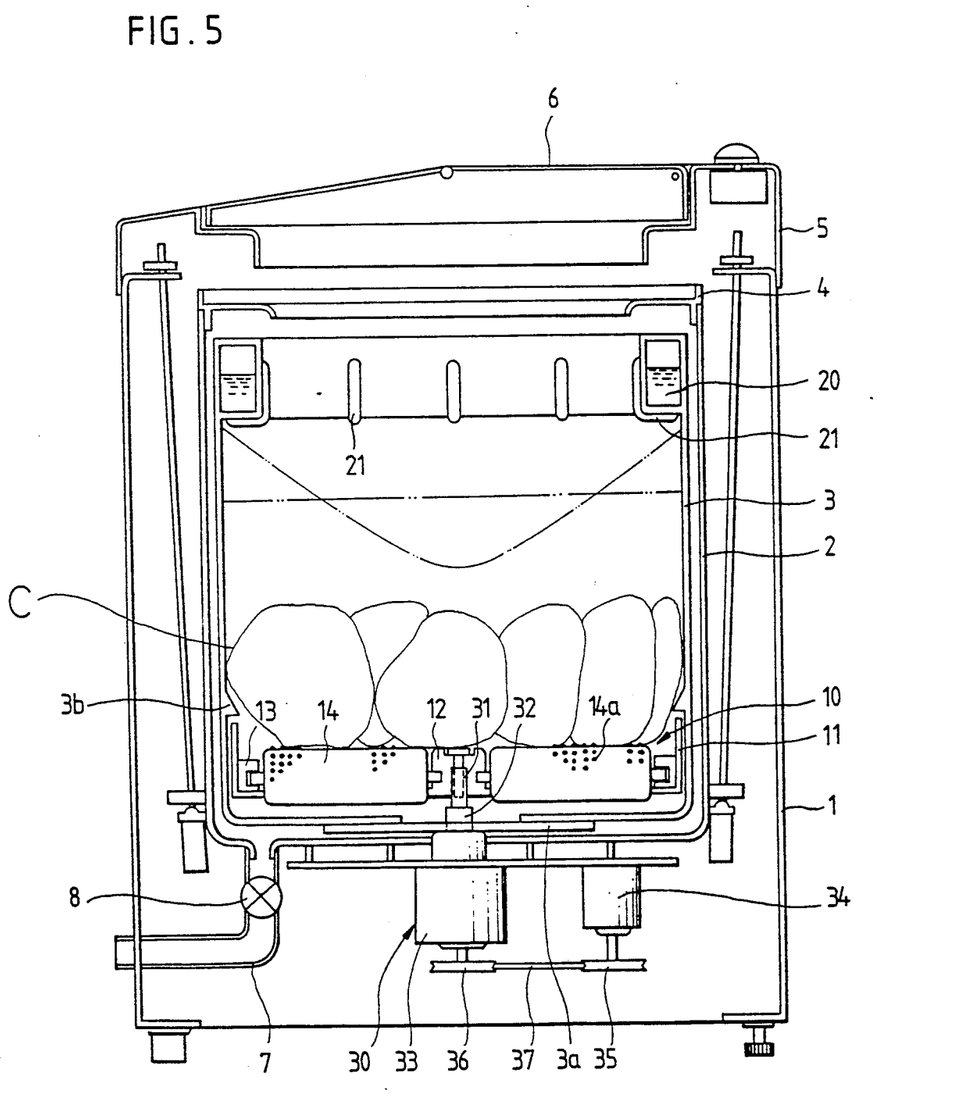
FIG. 5 is an elevational sectional view showing the whole structure of the washing machine.
Figure 6:
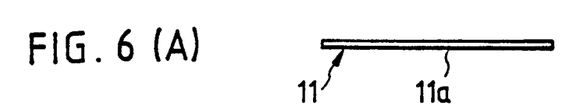
FIGS. 6A to 6E are sectional views showing embodiments of a rotator base, respectively.

Referring now to FIG. 5 which is an elevational sectional view showing the whole structure of the washing machine in accordance with a this invention, the washing machine with roller type agitator comprises a housing 1, an imperforated outer tub 2 installed inside housing 1, a washing and dehydrating tub 3 (hereinafter, referred to simply as a washing tub) rotatably mounted inside outer tub 2 and adapted for washing and dehydrating the laundry articles, a roller type agitator 10 rotatably mounted at the lower center of washing tub 3, an auto-balance 20 equipped at the upper portion of washing tub 3 and a driving mechanism 30 adapted for driving roller type agitator 10 and washing tub 3.

The roller type agitator 10 comprises a rotator 11, provided with a central bearing 12 and a peripheral bearing 13, and at least one roller 14 rotatably mounted by means of a rotation shaft to the rotator 11 between central and peripheral bearings 12 and 13 with the roller 14 desirably having a plurality of washing protrusions 14a formed on the outer surface thereof. However, the provision of the washing protrusions 14a is not indispensable.

Like the conventional washing machine, the driving mechanism 30 comprises a clutch 33 mounted under the bottom center of the outer tub 2 and having a washing shaft 31 and a dehydrating shaft 32, a reversible driving motor 34 fixed to outer tub 2 at a side of clutch 33 and having a motor pulley 35 connected to a clutch pulley 36 of clutch 33 by means of a belt 37. The washing shaft 31 supports the central bearing 12 inserted thereonto and secured by means of a set screw, and the dehydrating shaft 32 supports a radial reinforcement 3a engaging therewith and secured to the lower surface of the washing tub 3 so that according to the power transmitting control by the clutch 33 for the rotational power from the driving motor 34 the washing and dehydrating shafts 31 and 32 may selectively rotate and the agitator 10 and the washing tub 3 may in turn rotate selectively.

In the drawing, the reference numeral 4 denotes an outer tub cover; 3a denotes a wedge type annular protrusion formed at the inner surface of the washing tub 3; 5 denotes a top cover; 6 denotes a main door; 7 denotes a drain pipe; and 8 denotes a drain valve.

In operation, the above-mentioned washing machine has operations different from each other in respective cases of large quantity washing and small quantity washing. Therefore, the different operations will be separately described hereinafter.

In a washing operation for the large quantity of laundry articles, the laundry articles C accompanied with the washing water disposed in the washing tub 3 will directly contact the rollers 14 as the agitator 10 is biased downwardly by the weight of laundry articles C as shown in FIG. 5. In addition, the circulation speed of the laundry articles C is so different that a part thereof directly contacting rollers 14 of the rotating agitator 10 may have a relatively high speed circulation but another part thereof contacting with the auto-balancer 20 may have a relatively lower speed circulation, as result of the frictional contact with a plurality of washing protrusions 21 on the auto-balancer 20 and the inertia force induced by the weight of the laundry articles C. Therefore, the laundry articles C intend to stop circulating while the washing tub 3 intends to rotate and because of the contact frictional power the rollers 14 of the agitator 10 may roll in the opposite direction to the rotational direction of the agitator 10.

At this time, the laundry articles C are subject to the intensive bending and stretching action induced by the contact frictional power, generated from the contact of the laundry articles C with the rollers 14, and the circulation speed difference between the upper and lower parts of laundry articles C. As a result, simultaneously with displacing its washing position in the direction of a→b→c→d, a surface point P of the laundry articles C rolls in the vicinity of the rollers 14 in order to circulate inside the washing tub 3. Also, the circulating speed of the laundry articles C is relatively more rapid at the outside than that of the inside, thereby causing the rolling action of the laundry articles C to be more intensive at the outside than the inside. Accordingly, the circulation of the laundry articles C, which first actively circulated only in the vicinity of the rollers 14 of the agitator 10, gradually spreads to all of laundry articles C so that all of the laundry articles C can circulate.

In addition, the laundry articles C which became entangled in the reversed rotation of the agitator 10 will be unravelled in the forward rotation of the agitator 10, simultaneously with displacement thereof such that a part of the articles C located in the inside moves to the outside, while another part thereof located at the outside moves to the inside so that all of the laundry articles C can be equally washed and also a good washing effect can be obtained.

On the other hand, in the case of small quantity washing, the roller type agitator 10 of this washing machine, which agitator can provide a relatively intensive water flow in comparison with the known washing machine provided with the rotary vane wheel type, pulsator (agitator vane wheel) type or the rotary tub vane wheel type agitator, pulls downwardly, in the forward rotation of agitator 10. The laundry articles C by means of the intensive water flow generated from the rolling action of the rollers 14 circulate around the lower portion of the washing tub 3 near the agitator 10. However, as the agitator 10 changes its rotational direction from the forward direction to the reversed direction, the laundry articles C will rise intermittently because there is no pulling force acting thereon. As a result of the counterbalancing the water flows in accordance with the interfering action between the forward and reversed directional water flows, and thereafter, the laundry articles C will be again pulled downwardly by the intensive reversed directional water flow as the agitator 10 rotates in reverse direction at high speed. Thus, there may be an upward and downward circulation of the laundry articles C, and furthermore, an inward and outward circulation, that is to say rightward and leftward circulation of the laundry articles C, thereby causing all of the laundry articles C to be equally washed and a good washing effect to be obtained.

As described above, it is well noted that the washing machine with a roller type agitator in accordance with this invention can provide, irrespective of the quantity of the laundry articles, an equal and excellent washing effect for all of the laundry articles without any fabric damage as a result of the rolling action by the rollers 14 of the agitator 10.

Hereinafter, the various embodiments of a washing machine with roller type agitator in accordance with the present invention will be more detailedly described.

Referring first to FIGS. 6A to 6E which are sectional views showing several embodiments of a rotator base 11 in accordance with the present invention, respectively. The first embodiment of a rotator base shown in FIG. 6A comprises a horizontal surface 11a. The second embodiment of a rotator base shown in FIG. 6B, comprises a U-shaped base comprising a horizontal bottom surface 11a and upwardly and outwardly inclined side surface walls 11b. The third embodiment of a rotator base shown in FIG. 6C comprises a reversed U-shaped base comprising a horizontal bottom surface 11a and downwardly and outwardly inclined side surface walls 11c. The fourth embodiment of a rotator base shown in FIG. 6D comprises a V-shaped base comprising upwardly and outwardly inclined side surfaces 11d. The fifth embodiment of a rotator base shown in FIG. 6E comprises a reversed V-shaped base comprising downwardly and outwardly inclined side surfaces 11e.

However, the rotator base 11 may be constructed and formed of another type, beside the above-mentioned types within the scope of this invention.

The rollers 14 may be attached to the horizontal surfaces 11a or the inclined side walls 11b, 11c, 11d and 11e of the rotator base 11 in order to comprise an agitator 10, and the washing effect of the agitator 10 is different in accordance with the type of the agitator comprising a rotator base and rollers, while the general washing effect similar to that of the washing machine shown in FIG. 5 can be obtained irrespective of the difference of the type of the agitator.

Figure 7:
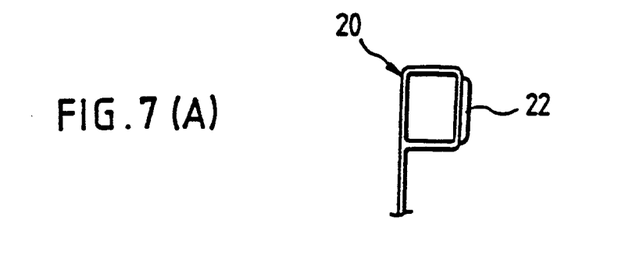
FIGS. 7A and 7B are sectional views showing embodiments of an auto-balancer, respectively.

FIGS. 7A and 7B are sectional views showing another embodiments of an auto-balancer in accordance with the invention, respectively. The auto-balancer 20 may have another type of a washing protrusion 22 mounted at the inner surface thereof as shown in FIG. 7A or still another type of washing protrusion 23 mounted at the lower surface thereof as shown in FIG. 7B, even though these types of washing protrusions each may provide a relatively lower washing effect than that of the washing protrusions 21 shown in FIG. 5.

Turning next to FIGS. 8A and 8B which are a plan view of another embodiment of an agitator comprising a disc rotator, agitating vanes and rollers in accordance with the present invention, and an elevational sectional view taken along the line A—A of FIG. 8A, respectively, this type of agitator 10 comprises a circular rotator base 11 and a plurality of rollers and washing vanes 14 and 15, which rollers and washing vanes 14 and 15 being radially and alternately arranged and spaced apart from one another on rotator base 11, respectively. Each washing vane 15 is formed lower than the base surface of rotator base 11.

Figure 9A:
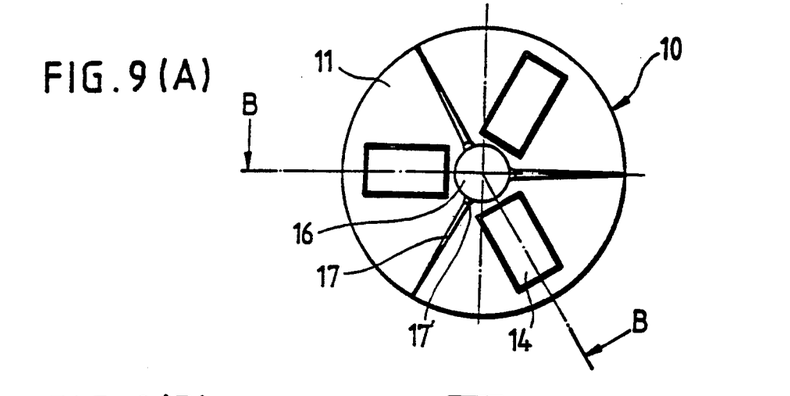
FIGS. 9A and 9B are a plane view of an agitator provided with a washing rod vertically formed on the center of the disc rotator shown in FIGS. 8, and an elevational sectional view taken along the line B—B of FIG. 9A, respectively.
Figure 9B:
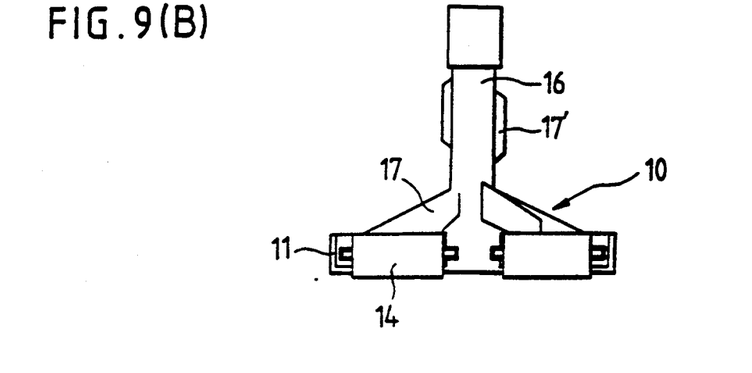

FIGS. 9A and 9B are a plane view of still another embodiment of an agitator 10 in accordance with the present invention, and an elevational sectional view taken along the line B—B of FIG. 9A, respectively. This type of agitator 10 comprises a circular rotator base 11 and a washing rod 16 vertically formed on the center of rotator base 11, a plurality of rollers and washing vanes 14 and 17 radially and alternately arranged and spaced apart from one another on rotator base 11, respectively. Washing vanes 17 each extrudes radially and outwardly from the lower portion of said washing rod 16, washing rod 16 having at the side surface thereof washing protrusions 17' extruding outwardly.

Figure 10:
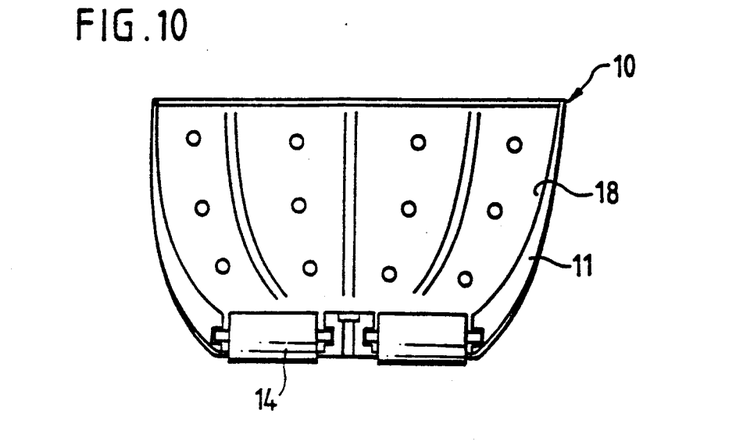
FIG. 10 is an elevational sectional view of an agitator comprising an agitating tub provided with rollers at the lower portion thereof.

Still another embodiment of an agitator 10 in accordance with this invention is shown in FIG. 10 which is an elevational sectional view. This type of agitator 10 comprises an agitating tub base 11 provided with rollers 14 at the lower portion thereof and a side wall 18 upwardly and outwardly extending and having an optimum height.

Figure 8:
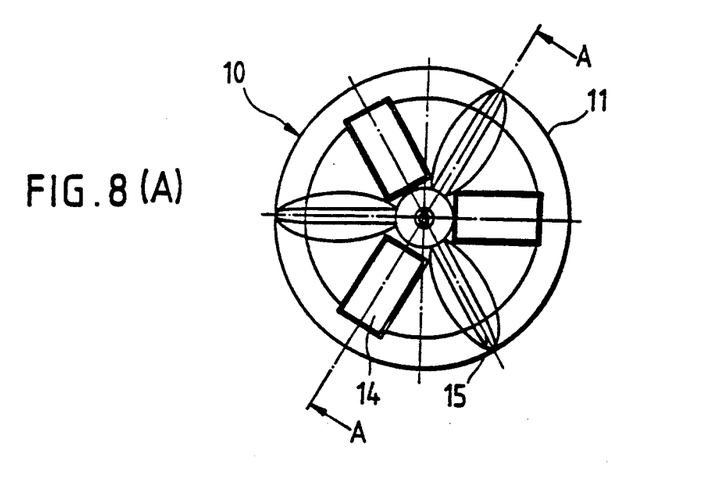
FIGS. 8A and 8B are a plane view of an agitator comprising a disc rotator, agitating vanes and rollers, and an elevational sectional view taken along the line A—A of FIG. 8A, respectively.

The agitators 10 shown in FIGS. 8 to 10 can be adapted to the conventional types of washing machines without difficulty in order to improve the washability.

Figure 11:
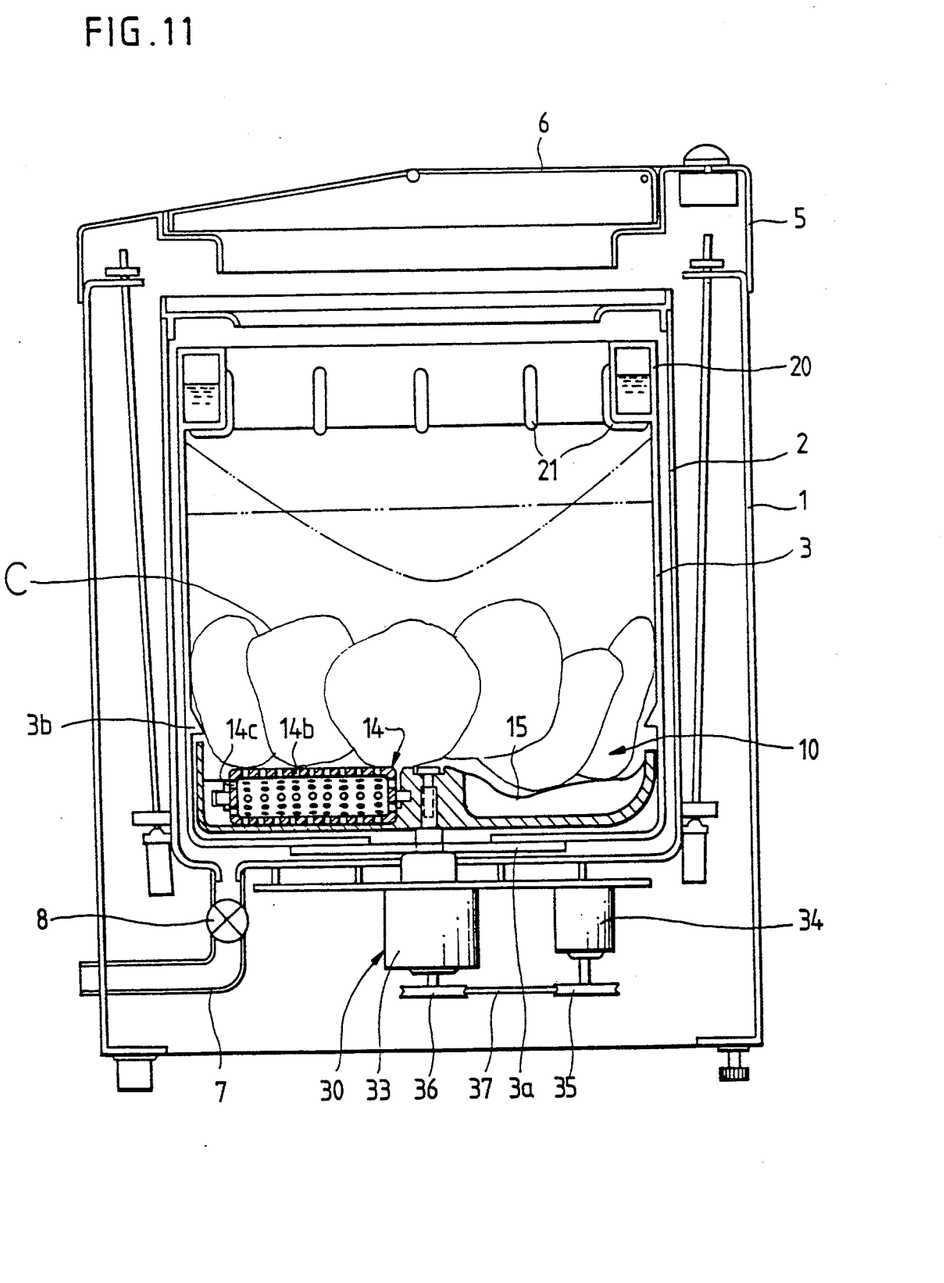
FIG. 11 is an elevational sectional view showing another embodiment of a washing machine with a roller type agitator in accordance with the present invention.
Figures 12A, 12B:
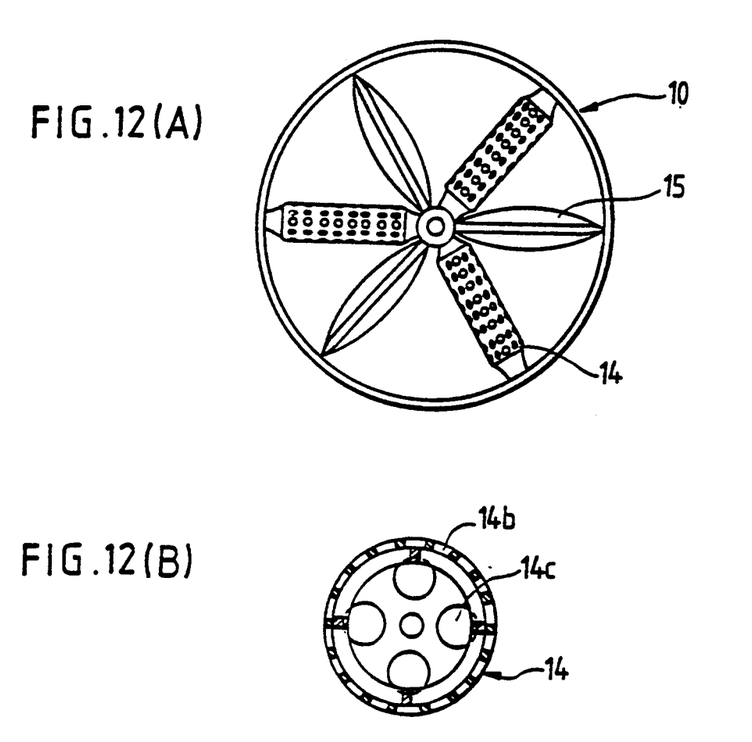
FIGS. 12A and 12B are an enlarged plane view of the agitator of FIG. 11 and a cross sectional view of the roller of FIG. 12A, respectively.

Turning next to FIGS. 11 and 12 which each shows a washing machine provided with still another embodiment of an agitator. This type of agitator 10 comprises a rotator base and a plurality of rollers and washing vanes 14 and 15, which rollers and washing vanes 14 and 15 are radially and alternately arranged and spaced apart from one another on the rotator base, respectively. Each washing vane 15 is formed lower than the height of each roller 14, therefore, this type of agitator 10 is generally similar to that of FIGS. 8A and 8B.

As shown in FIGS. 8A and 8B, it is desirable to form each washing vane 15 lower than the height of the upper surface of the rotator base 11. However, the washing vane 15 may be formed lower than the height of each roller 14 as described above in conjunction with FIGS. 11 and 12. In addition, each roller 14 is provided at the circumferential outer surface and both side surfaces thereof with a plurality of washing water inlet and outlet ports 14b and 14c, respectively, so as to generate the turbulent water flow simultaneous with reducing the fluid resistance thereof.

It is desirable to form the water outlet ports 14c, provided at both side surfaces of each roller 14, larger than the water inlet ports 14b formed at the circumferential outer surface thereof.

Also, the auto-balancer 20 is, as shown in FIG. 5, provided with a plurality of washing protrusions 21 at the lower inner portion thereof.

Figure 17:
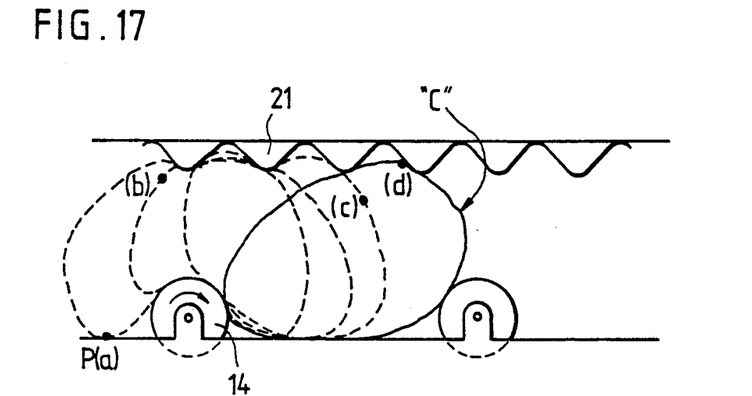

The washing machine shown in FIG. 11 has respective washing operations in accordance with the quantity of the laundry articles C, large volume and small quantity washing operations. In other words, the laundry articles C positioned between the auto-balancer 20 and the agitator 10, as shown in FIGS. 11 and 17, will be subject to the rolling action provided by the rotation of the agitator 10 simultaneously with being circulated with the water flow, and also subject to the bending and stretching action and the scrubbing action each provided by the washing protrusions 21 of the auto-balancer 20 and the rollers of the agitator 10, thereby causing the laundry articles to be washed efficiently.

At this time, the washing vanes 15 of the agitator 10 generate a vortex flow which can also improve the washing effect. The rollers 14 are, additionally, mainly subject to the rolling and frictional action induced by the contact with the laundry articles C, while the water flow is mainly generated by the washing vanes 15 each having a relatively small size so that the necessary torque for driving the agitator 10 may be small, resulting in a reduced output of the driving motor 33, thereby making it possible to use a relatively small capacity driving motor.

Also, the water level in case of the small quantity washing is relatively lower so that the washing effect influenced by the auto-balancer 20 is very little but the heart style water flow generated by the washing vanes 15 of the agitator 10 is great. However, the size of each roller 14 is considerably larger than that of the washing vanes 15 so that the roller 14 may decisively influence the circulation of the laundry articles C.

Simultaneously with the passing through the washing water inlet ports 14b provided on the circumferential outer surface of the rollers 14 the water flow generated by the washing vanes 15 becomes a more intensive turbulent flow so that the washing effect may be improved. Because of providing the washing water inlet and outlet ports on the outer and both side surfaces of each roller 14, relatively larger outlet ports 14c on both side surfaces and relatively smaller inlet ports 14b on the circumferential outer surface, the washing water can efficiently enter the water inlet ports 14b of the circumferential outer surface in case of the rotation of the agitator 10, while the washing water inside each roller 14 can easily go out of roller 14 through the water outlet ports 14c as a result of the centrifugal force generated by the rotation of the agitator 10.

In accordance, the washing machine shown in FIGS. 11 and 12 can reduce the fluid resistance resulting from providing the washing water inlet and outlet ports 14b and 14c on the outer and both side surfaces of the rollers 14, which fluid resistance may be generated by the rollers 14. Thus, the necessary torque for rotating the agitator 10 during the washing operation can be reduced so that it may be possible to use a relatively small capacity driving motor.

Also, the washability of the washing machine of FIGS. 11 and 12 can be considerably improved by the efficient water flow despite using the relatively small capacity driving motor, which driving motor will output a relatively small power so as to provide a relatively small input energy for the agitator.

Additionally, the above-mentioned washing machine, in comparison with the relatively lower washability, because of the little difference in the relative speed between the washing water and the laundry articles generated from the rotational flow provided by the known washing machines, provides an advantage of improving the washability as a result of providing the intensive turbulent flow.

Figure 13A:
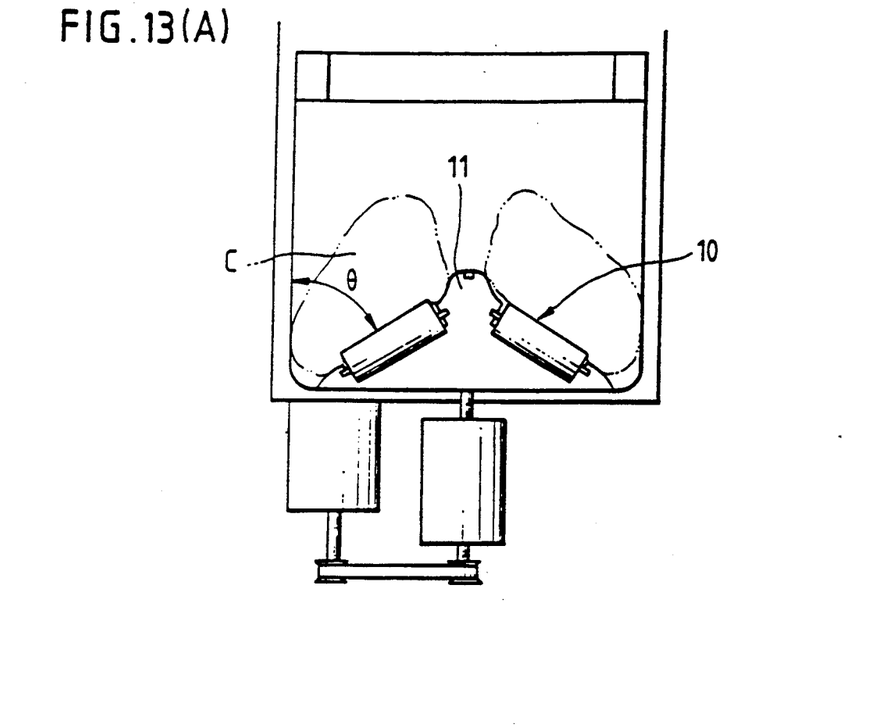
FIGS. 13A and 13B are a schematic view showing another embodiment of an agitator comprising a mountainous rotator having rollers in accordance with the present invention, and a plane view of the agitator of FIG. 13A, respectively.
Figure 13B:
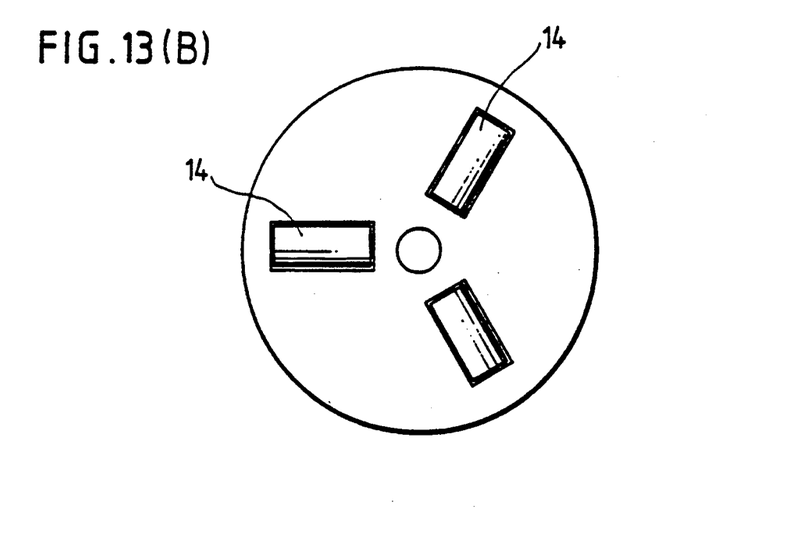

FIGS. 13A and 13B are a schematic view showing a washing machine provided with still another embodiment of an agitator in accordance with the present invention and a plane view of the agitator of FIG. 13A, respectively. The agitator 10 comprises a mountainous rotator 11 provided with rollers 14, which rollers 14 are radially arranged and spaced apart from one another and also inclined to the inner surface of the washing tub 3 at a predetermined angle $\theta$.

The washing machine of FIGS. 13 can provide, in the washing operation, an intensive upward and downward water flow of the washing water resulting from the inclined arrangement of the rollers 14 to the inner surface of the washing tub 3.

Figure 14A:
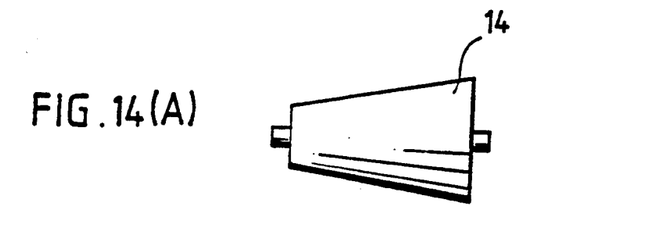
FIGS. 14A and 14B are schematic side views showing embodiments of a roller in accordance with the present invention, respectively.
Figure 14B:
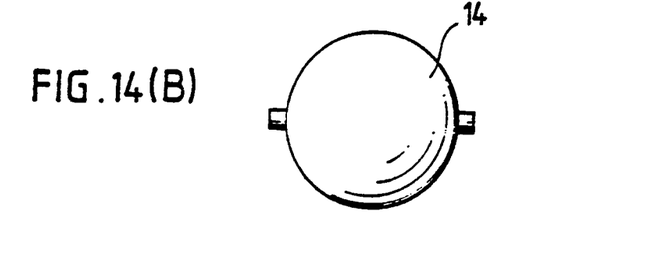

Turning next to FIGS. 14A and 14B which are schematic side views showing embodiments of a roller in accordance with the present invention, respectively, the rollers 14 may be constructed as conical shaped as shown in FIG. 14A or ball shaped shown in FIG. 14B. However, the rollers 14 may be constructed as another shaped roller beside the shapes shown in FIGS. 14.

Figure 15:
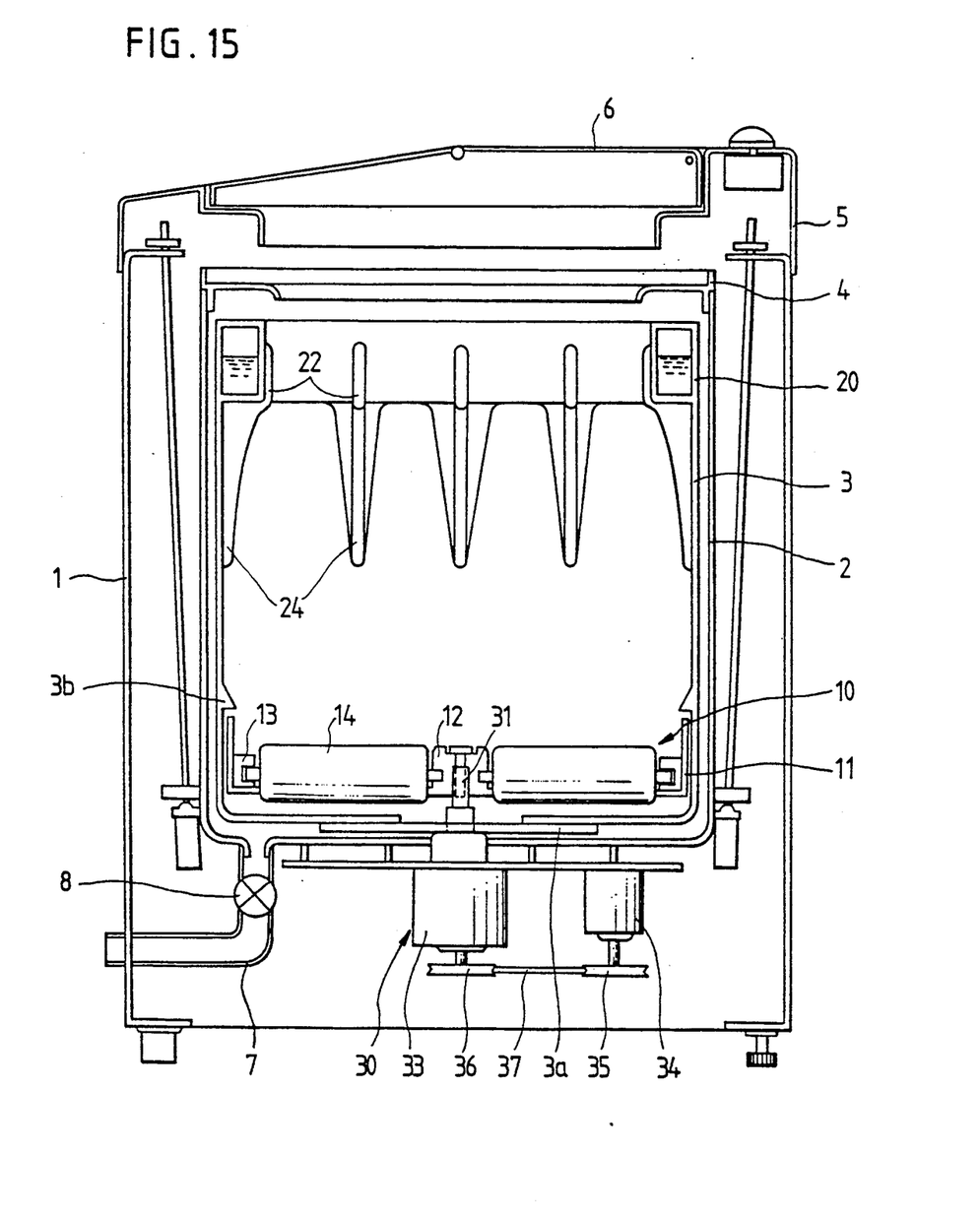
FIG. 15 is an elevational sectional view showing a washing machine provided with another embodiment of a washing tub in accordance with the present invention.

FIG. 15 is an elevational sectional view showing a washing machine provided with another embodiment of a washing tub in accordance with the present invention. The washing tub 3 includes an auto-balancer 20, provided with a plurality of washing protrusions 22 formed spaced apart from one another at the under surface thereof, and a plurality of reversed triangular shaped washing protrusions 24. Each reversed triangular shaped washing protrusion 24 gradually and downwardly become narrower and extends from each washing protrusion 22 of the auto-balancer 20 so as to be integrally formed therewith.

The washing tub 3 of FIG. 15 can considerably improve the washability as a result of the washing protrusions 24.

Figure 16:
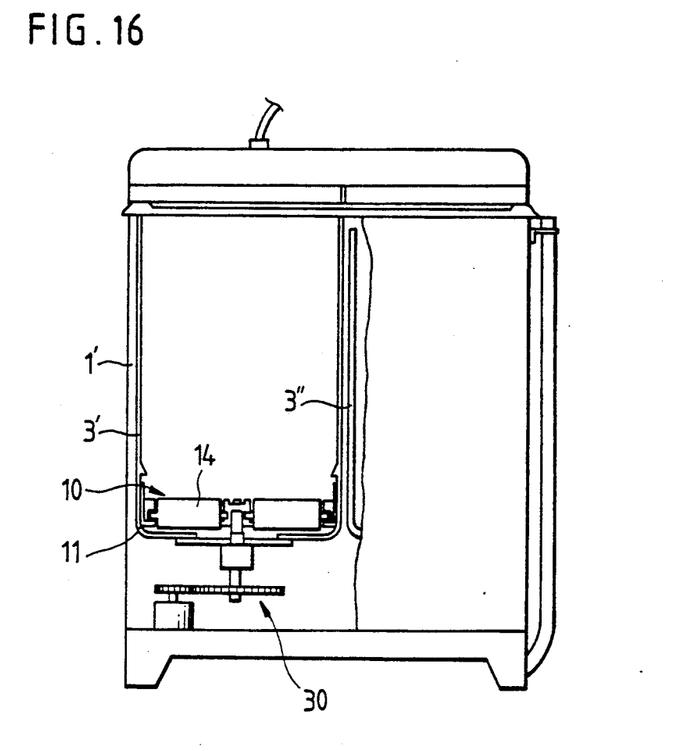
FIG. 16 is a partially broken elevational sectional view of a double tub type of washing machine provided with an agitator in accordance with the present invention.

Turning next to FIG. 16 which is a partially broken elevational sectional view of a double tub type of washing machine provided with an agitator in accordance with the present invention, the washing machine comprises a washing tub 3' arranged at a side inside the housing 1' and a dehydrating tub 3" arranged at the other side, which washing tub 3' is provided with a roller type agitator 10 on the bottom and a driving mechanism 30 equipped under the bottom thereof. This type of washing machine is an embodiment in which the roller type agitator 10 according to this invention is applied to the conventional double tub type of washing machine, which type washing machine washes the laundry articles in the washing tub 3' and then dehydrates the washed articles in the dehydrating tub 3".

As above-mentioned, the washing machine in accordance with the present invention can provide a good washing effect and an excellent washability irrespective of the quantity of the laundry. In other words, the laundry articles C in case of large quantity washing are efficiently washed by the bending and stretching action accompanying the smooth circulation generated by the interaction among the roller type agitator 10, the washing protrusions 21, 22 and 23 of the auto-balancer 20 and the washing protrusions 24 of the washing tub 3, thereby causing the washing effect to be improved and making it possible to equally wash all of the laundry articles. In addition, there little fabric damage occurs because of the rolling action of the rollers 14 during the contact of the laundry articles C with the rollers 14 of the agitator 10, and furthermore, it is possible to obtain a good washing effect, which is similar to that in case of the large quantity washing, and washing the large volume laundry articles such as a blanket and a bed clothes.

Also, the laundry articles C in case of small quantity washing can be washed accompanying a smooth circulation, which circulation moving inwardly, outwardly, upwardly and downwardly, by means of the rollers 14 of the agitator 10 during the forward and reversed directional rotation of the roller type agitator 10, thereby causing the washing effect to be improved and making it possible to equally wash all of the laundry articles.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A washing machine comprising a washing tub, a driving mechanism for driving a washing part, and an agitator provided within the washing tub for agitating laundry articles, the agitator comprising:

a circular rotator base and a washing rod vertically formed on the center of said rotator base, said rotator base having a plurality of rollers and washing vanes radially and alternately arranged and spaced apart from one another, said washing rod having washing protrusions formed on a side surface extruding outwardly therefrom, the agitator providing a bending and stretching action for said laundry articles and a smooth circulation of washing water.

2. A washing machine comprising a washing tub, a driving mechanism for driving a washing part, and a roller type agitator provided within the washing tub for agitating laundry articles, the roller type agitator including a rotator base disposed at a lower portion thereof, said rotator base being provided with at least one roller rotatably mounted thereto, said roller type agitator providing a bending and stretching action for said laundry articles and a smooth circulation of washing water, wherein said washing tub is provided with a plurality of washing protrusions disposed on an upper portion there inside, each of said protrusions gradually and downwardly becoming narrower.

3. A washing machine with a roller type agitator as claimed in claim 2, wherein said rotator base of said agitator is circular and has at least one washing vane, said at least one washing vane and rollers being radially and alternately arranged and spaced apart from one another.

4. A washing machine with a roller type agitator as claimed in claim 2, wherein said roller type agitator comprises a washing side wall extending from the periphery of said rotator base.

5. A washing machine with a roller type agitator as claimed in claim 2, wherein said roller type agitator comprises a mountainous rotator provided with rollers thereon, which rollers are radially arranged and spaced apart from one another.

6. A washing machine with a roller type agitator as claimed in claim 2, wherein said at least one roller is provided with a plurality of washing protrusions formed on the outer surface thereof.

7. A washing machine with a roller type agitator as claimed in claim 2, wherein said rotator base of said agitator comprises a horizontal bottom and inclined side walls extending upwardly or downwardly from said horizontal bottom, said rollers being mounted on said horizontal bottom or said inclined side walls.

8. A washing machine with a roller type agitator as claimed in claim 2, wherein said at least one roller of said agitator comprises a cylindrical shaped roller, a conical shaped roller or a ball shaped roller.

9. A washing machine with a roller type agitator as claimed in claim 2, wherein said at least one roller of said agitator is provided at the circumferential outer surface and both side surfaces thereof with a plurality of washing water ports for simultaneously generating a turbulent water flow and preventing an overload from said agitator.

10. A washing machine comprising a washing tub, a driving mechanism for driving a washing part, and a roller type agitator provided within the washing tub for agitating laundry articles, the roller type agitator including a rotator base disposed at a lower portion thereof, said rotator base being provided with at least one roller rotatably mounted thereto, said roller type agitator providing a bending and stretching action for said laundry articles and a smooth circulation of washing water, wherein said washing tub is provided with an auto-balancer disposed at an upper portion thereof, said auto-balancer including a plurality of washing protrusions spaced apart from one another.

11. A washing machine comprising a washing tub, a driving mechanism for driving a washing part, and an roller type agitator provided within the washing tub for agitating laundry articles, the roller type agitator being provided with at least one roller rotatably mounted thereto, said roller type agitator providing a bending and stretching action for said laundry articles and a smooth circulation of washing water, said agitator including a rotator base, wherein said rotator base of said agitator comprises a horizontal surface plate, V-shaped inclined surface plates or reversed v-shaped inclined surface plates, said at least one roller being mounted to said surface plate.

12. A washing machine comprising a washing tub, a driving mechanism for driving a washing part, and an agitator provided within the washing tub for agitating laundry articles, wherein said agitator includes a plurality of rollers and washing vanes which are radially and alternately arranged, each of said washing vanes being formed lower than the height of of said rollers, the agitator providing a bending and stretching action for said laundry articles and a smooth circulation of washing water.

13. A washing machine comprising a washing tub, a driving mechanism for driving a washing part, and an agitator provided within the washing tub for agitating laundry articles, the agitator providing a bending and stretching action for said laundry articles and a smooth circulation of washing water, wherein said agitator includes a plurality of rollers and said rollers are provided at the circumferential outer surface and both side surfaces thereof with a plurality of washing water ports for simultaneously generating a turbulent water flow and preventing an overload from said agitator, and wherein said water ports provided at both side surfaces of each of said rollers are larger than said water ports provided at the circumferential outer surface of each of said rollers.

* * * * *